United States Patent
Weldemariam et al.

(10) Patent No.: US 11,314,373 B2
(45) Date of Patent: Apr. 26, 2022

(54) VIGILANT COGNITIVE CURSOR BASED ON CLIPBOARD BUFFER CONTENTS

(71) Applicant: International Business Machines Corporation, Armonk, NY (US)

(72) Inventors: Komminist Weldemariam, Ottawa (CA); Michael S. Gordon, Yorktown Heights, NY (US); Clifford A. Pickover, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/856,109

(22) Filed: Apr. 23, 2020

(65) Prior Publication Data

US 2021/0333977 A1    Oct. 28, 2021

(51) Int. Cl.
| | |
|---|---|
| *G06F 3/0481* | (2022.01) |
| *G06F 3/01* | (2006.01) |
| *G06F 3/16* | (2006.01) |
| *G06F 9/451* | (2018.01) |
| *G06K 9/00* | (2022.01) |
| *G06F 3/04812* | (2022.01) |
| *G06V 40/16* | (2022.01) |

(52) U.S. Cl.
CPC .......... *G06F 3/04812* (2013.01); *G06F 3/016* (2013.01); *G06F 3/167* (2013.01); *G06F 9/451* (2018.02); *G06V 40/174* (2022.01); *G06F 2203/014* (2013.01)

(58) Field of Classification Search
CPC ............ A61B 5/7275; G06K 9/00302; G06K 9/00845; G06F 3/015; G06F 2203/011; G06F 9/451; G06F 3/0227; G06F 3/04812
See application file for complete search history.

(56) References Cited

U.S. PATENT DOCUMENTS

| | | | |
|---|---|---|---|
| 6,018,345 A | 1/2000 | Berstis | |
| 6,944,821 B1* | 9/2005 | Bates | G06F 40/166 715/209 |
| 8,184,096 B2 | 5/2012 | Louch | |
| 8,230,366 B2 | 7/2012 | Chaudhri | |
| 10,338,736 B1* | 7/2019 | Smith | G06F 1/1647 |
| 2002/0171690 A1* | 11/2002 | Fox | G06F 3/04812 715/862 |
| 2007/0022391 A1* | 1/2007 | Kim | G06F 3/04812 715/856 |
| 2009/0140978 A1* | 6/2009 | Louch | G06F 3/04812 345/157 |

(Continued)

OTHER PUBLICATIONS

Morgan, J., "Copying and Moving Data with the Visible Clipboard", https://usabilityetc.com/articles/visible-clipboard/, Accessed on Feb. 3, 2020, 7 pages.

*Primary Examiner* — Sang H Kim
(74) *Attorney, Agent, or Firm* — Scully, Scott, Murphy & Presser, P.C.; Shimon Benjamin (57) ABSTRACT

An operation performed with a computer cursor on a graphical user interface (GUI) can be detected, which operation copies content pointed to by the computer cursor into a memory buffer. An analysis can be performed to determine a risk associated with the operation. Based on the analysis, a change in a GUI element of the GUI can be made or caused.

19 Claims, 4 Drawing Sheets

(56) References Cited

U.S. PATENT DOCUMENTS

| | | | |
|---|---|---|---|
| 2013/0147793 A1* | 6/2013 | Jeon | G02B 30/30 |
| | | | 345/419 |
| 2013/0173727 A1* | 7/2013 | Libin | H04L 51/063 |
| | | | 709/206 |
| 2015/0007116 A1* | 1/2015 | Visser | G06F 3/04842 |
| | | | 715/856 |
| 2015/0193124 A1* | 7/2015 | Schwesinger | G06F 3/017 |
| | | | 715/863 |
| 2016/0378295 A1* | 12/2016 | Cousins | G06F 3/04812 |
| | | | 715/702 |
| 2017/0039326 A1* | 2/2017 | Stankiewicz | G06F 16/93 |
| 2017/0223413 A1* | 8/2017 | Kozloski | H04N 21/252 |
| 2018/0188924 A1* | 7/2018 | Kumar | G06F 9/4843 |
| 2018/0275842 A1 | 9/2018 | Padmanabhan et al. | |
| 2018/0335937 A1 | 11/2018 | Hauenstein et al. | |
| 2021/0065900 A1* | 3/2021 | Douglas | G16H 50/20 |

* cited by examiner

VIGILANT COGNITIVE CURSOR BASED ON CLIPBOARD BUFFER CONTENTS

BACKGROUND

The present application relates generally to computers and computer applications, and more particularly to a graphical user interface (GUI) and GUI elements.

A computer operating system or the like provides a buffer or space in memory, also referred to as a clipboard, for saving or storing, for example, temporarily, content which has been selected for a cut, copy or paste operation. Some computer systems include a clipboard manager for managing the content. Such operations are performed on a computer graphical user interface (GUI), for example, at the point where a computer cursor is displayed or presented.

BRIEF SUMMARY

A computer-implemented method, in one aspect, can include detecting an operation performed with a computer cursor on a graphical user interface (GUI), which stores content pointed to by the computer cursor into a memory buffer. The method can also include performing an analysis to determine a risk associated with the operation. The method can also include, based on the analysis, causing a change in a GUI element of the GUI.

A system, in one aspect, can include a hardware processor and a memory device coupled with the hardware processor. The hardware processor can be configured to detect an operation performed with a computer cursor on a graphical user interface (GUI), which copies content pointed to by the computer cursor into a memory buffer on the memory device. The hardware processor can also be configured to perform an analysis to determine a risk associated with the operation. The hardware processor can also be configured to, based on the analysis, cause a change in a GUI element of the GUI.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system, method and technique is disclosed, which can provide a graphical user interface (GUI) element such as a cursor for copying content and analyzing an action performed via the cursor. The cursor can be controlled by an input device (e.g., a pointing device, a mouse, gesture, fingers on touch screen). Based on an analysis, for example, of the copied content, the system, method and technique can change the GUI element such as the cursor. Changing can include, but is not limited to, changing the cursor colour, shading or shape, speaking or vocalizing a word (e.g., via voice synthesis), and/or changing a frame of a text editor on which the cursor (GUI element) is being used.

A computer user interface graphical element such as a cursor is a useful indication of user's focus of attention on a computer screen. For example, a position or location of a computer cursor on a display screen can provide an indication of an area of text or content the user is looking at, and can serve as a prelude to the formation and execution of an intention such as a decision to copy, move or delete the text or content. As such, a computer cursor can represent a point where cognitive computing capabilities can be tapped to augment human cognitive functioning. In an embodiment, a methodology can focus on the point where the cursor has been used to select content and the content has been cut or copied into a memory such as a clipboard. Such copying or cutting, and pasting can provide an indication of the user's intent to move, delete, or duplicate the content, and can provide a context for the computer to automatically offer helpful assistance and remediation for common errors associated with moving, deleting, or duplicating content.

While the description herein uses the term "cursor," any other graphical element which is provided or used as a movable indicator on a computer screen identifying a position that can be affected by input from the user, can apply.

Users of computers and related devices frequently move text or content by copying and pasting pieces of text or content (e.g., words, sentences, paragraphs). Users also often copy and paste images taken from other sources, for instance, the World Wide Web, or within the body of the document. In some cases, due to conditions such as hastiness, tiredness, waning motor control (or not being careful), and/or other factors, it is possible that users accidentally "copy" the wrong piece of text or content, for example, because the cursor is positioned slightly off the target content or is in the wrong location. Also, it is possible that a user mistypes or incorrectly enters a short-key sequence such as the Control-C keyboard sequence for copying the desired target content. For example, sometimes a user may accidentally be off of the "C" key. Similarly, the user may not press the control-V sequence (e.g., for pasting) correctly and the text intended to be copied can get lost.

It can be useful to a user if the cursor were to change depending on the size of the text in the copy/paste buffer, and/or other characteristics of the text, or image, to be copied. Then, for example, before a user attempts to "paste," the text or image, the user would know that something is amiss, because the cursor has the wrong appearance.

In the methodology disclosed herein, in an embodiment, the user can know by glancing at the cursor that something that the user intended is not being executed, even before the user notices that the pasted content is not quite right.

The following illustrates an example use case. A user intends to copy one word, but the user unintentionally copies an entire sentence (or even an entire document) by mistake. In another example, the user copies one word plus a small superscripted number that includes footnote text, or one word plus an invisible formatting character that includes a text box elsewhere in the document. The methodology in an embodiment can cause the curse to indicate that the user (erroneously) copied 200 words by speaking the word "200" or showing the word "200". In the correct scenario, the cursor can be caused to vocalize or speak the word "one,"

indicating "1," or displaying the number of characters in the single word that was intended to be copied. As another example, the methodology can cause the number of sentences, paragraphs, pages or images selected by the user to be indicated. As yet another example, the size of the cursor could indicate the amount of text selected to be copied, deleted or pasted. Still yet, the cursor can change its graphical characteristic, such as colour, e.g., green for 1 word, a different colour for a different number of words. In this manner, the user easily sees the cursor and realizes, "I only wanted to copy one word (or one image), and the cursor is red, which means I actually have more than the intended number of words in my buffer, e.g. 100 words."

In an embodiment, the methodology need not "know" what is wrong or right or even the user's actual intent, since merely giving a visual or audio indication can be helpful, especially when editing large documents. In yet another embodiment, the methodology may estimate that there may be something unintended about what is stored in the clipboard or a like memory buffer, (e.g. inappropriateness of the copy/paste) and use such information in changing the cursor or other graphical objects, and/or modifying an audio signal (e.g., speaking what is in the clipboard, or memory buffer that is storing the copied content, e.g., for pasting).

A methodology in an embodiment can monitor a cursor on a display screen and responsive to a user controlling the cursor to copy content, the methodology can analyze the content and change a characteristic of a GUI element. For instance, the appearance of the cursor itself (e.g., the cursor colour changes), display frame where the cursor appears (e.g., a frame of a text editor changes), vocalizing or effecting a sound, which can be associated with the content (e.g., a word is spoken) which has been copied to a buffer. The cursor can be controlled by an input device or mechanism, e.g., a mouse, a touchpad, keyboard, a gesture such as a finger and/or hand gesture, a trackpoint, a joystick, eye gaze, electroencephalogram (EEG)-brainwave interface, and/or another. The content may include text, image, or another type of content.

The analysis may include determining one or more of the following information, but not limited to such: the number of words selected and placed in the buffer (also referred to as a memory buffer or memory) such as a clipboard, number of images selected, content of text, origin of text, content of images, confidentiality level of content, keywords in text, product names in text, presence of confidential product photos or copyrighted photos, inappropriate language in text, language or foreign language of the text (e.g., French), size of items selected in the clipboard. Analysis can further include determining whether proper attribution such as authorship or the proper source, has been given or noted. Such analyzing may include using techniques such as the Natural Language Processing techniques and/or using any metadata that is available associated with the copied content. A database can be maintained, which can include information about which content is considered confidential, inappropriate, and/or otherwise should not be copied. For example, a database may contain collections of confidential and/or sensitive data, which should not be copied, e.g., company-internal product terms, names, phrases, diagrams, photographs, audio-visual content, and other samples of sensitive content that a user may consider too risky to copy. In an embodiment, the analysis may include comparing these pieces of sensitive text and/or graphics in the database to the clipboard contents so as to enable the system to trigger a cursor change or other change reflecting the potential copying of one or more sensitive items. The analysis may also use various known approaches to determining buffer size and other content characteristics. By performing text and image searches on the Web and/or in various databases, the original provenance or source of text and images may be estimated, so as to estimate a risk level, inappropriateness, and/or other characteristic of the copied content.

The GUI element changes can include any one or more of: change in cursor attributes (size, colour, shape, symbol, animation, blinking rate, and/or other); a sound is produced (spoken words, beep, chime, and/or other); haptic feedback (e.g., increased weight or friction associated with more content, buzzing of mouse or input device, change in mouse or input device response rate); a GUI element not directly associated with the cursor changes (e.g., the colour of a frame of an application such as a word processor or image editor), a task bar change, and/or other.

For example, consider a user who is working on a document, and any content that is copied into the document should not have certain words, pictures of certain products. A database of such words and images may be maintained that the methodology can check so as to appropriately change a characteristic of the cursor. For example, a photo of a future hardware product of a company may not be appropriate to actually be shown in other documents, or it may be of a sensitive nature, and, thus, a user seeing the product image with a red line through it, as part of the cursor, maybe be helpful.

More kinds of information may easily be discerned, such as by changing the cursor to the flag of a country that represents the language or foreign language of text in the clipboard (perhaps useful for an international document with more than one language) or a photo of the author of the text in the current clipboard. For example, consider a document authored by 4 people, and consider that the text written by the various authors is known. When a user attempts to copy "Author A's contribution" to another document, a photo of Author A or another image associated with the author may be shown as the cursor, as a helpful reminder to the user of a particular author's contribution.

The methodology may include learning a measure, concern, or risk associated with copy or cut, and paste operation. For example, a target document may be marked as particularly important. In another aspect, the methodology may automatically determine or estimate the importance associated with the target document, for example, from the folder where the document is saved or located, text analysis, file-type, and so forth. Similarly, a data file representing programming code may have a different importance level than one without code. For instance, consider the following scenario: a user is busy and must complete their work with a tight due date for completing code delivery. In this case, a predicted copy-paste error rate may affect the user deliverables, and the methodology can be useful in providing feedback. The document/content metadata information along with the copied context may be used to determine the concern or risk level of the copied content in the buffer.

In an embodiment, the methodology may learn a measure, concern and/or risk related to a copy/paste operation from one or more rules, and/or past or historical data associated with user actions. For example, if the user has copied 2000 words when filling out a form that typically allows a few words in each input field, there is a risk that this copy operation is an error, and the cursor or other GUI element may change an attribute such as colour. If the user has copied a confidential company-product name into the copy buffer, the risk level may be high when this name is being copied into a document file. The system may learn over time as to what is a risky copy/paste act, for example, through user or other feedback, and/or a user "undoing" (canceling or reverting) a copy/paste operation, e.g., after the user has noticed something is amiss with the content being copied. For example, if 50 users have 50 times "undid" a copy/paste image for a particular image or word, then the system learns that this may pose a level of extra risk for future users who attempt similar or the same copy operations.

In an embodiment, the methodology can check to determine whether the author is plagiarizing the work of another author when a section of text (e.g., sentence, paragraph) is copied from another source, inserted into the present document, without providing the proper reference or citation. The cursor may indicate a likelihood of improper acknowledgement, by blinking (e.g., in red), or indicating a "citation alert" icon, for instance, and/or speaking in a prerecorded voice, e.g., "please reference the author in the text that has been inserted from another source."

In an embodiment, the methodology may detect or predict (e.g., with a confidence level) the target "pasting" location of the copied content by tracking the user eye-gaze (via eye tracking) and/or analyzing previous cursor location or locations. The methodology may use content semantics of the predicted target "pasting" location or locations and user context to determine cursor indicator change.

In an embodiment, the user context may include one or more of, but not limited to: time of day and location, context determined from mouse movements (e.g., speed and accuracy that may suggest that a user is tired or alert, copying the wrong contents and redoing the copy/paste), touchpad, trackpad or touch display device and user computing device (e.g., laptop, computer (PC), tablet), the mood of the user (e.g., based on facial expressions, voices, access to calendars showing how busy the user is), context based on what application or computing device the user has interacted with, context based on the user activity (e.g., drawing, writing, calculating, music/video composing.

The detected or predicted target pasting location for copied content may also have social features such as indicating the intended recipients (email, text messaging), intended readers (restricted chat channels), and possible viewers (other forms of social media). In an embodiment, in such cases, it can be useful to analyze social factors such as the number, locations, and organizational affiliations of channel users or email recipients. For example, exposing confidential content to members of the same organization may be acceptable, but exposing it to an audience outside of the organization may merit a warning, which may take many forms. Similarly, textual expressions or images that are acceptable in some contexts and/or cultures may be offensive in others.

In an embodiment, the methodology may include estimating a mood of the inserted text or image. The methodology may include transforming the cursor into a graphical display such as an emoji to indicate this mood. In an embodiment, the methodology may present or display or cause to present or display a string of emojis for the estimated sentiment associated with the last N clipboard contents. Mood of inserted content may be estimated by known methods of sentiment analysis related to word choice, adjective use, punctuation use, emoticon use, inflammatory language use, facial expressions that appear in photographs, etc.

The emoji cursors may also indicate a distraction level of the user at the time a copy/paste was performed. For example, if a user has 10 open windows, received a phone call, and the cursor shook during the operation, perhaps a distraction level is higher than when there is just one window open and the user has focus and displays a very smooth movement of text from source to destination. For example, the methodology may determine a distraction level based on monitoring the movement of an input device and the number of windows or applications opened on the display screen or in a computer user login session. In an embodiment, the emoji cursor can indicate whether the inserted text is consistent in tone, mood or content with the surrounding text. For instance, the methodology may cause an "unhappy" emoji cursor to be presented or displayed responsive to determining that content or text is inserted in the wrong location in the document.

In an embodiment, the methodology may analyze the tone of the copied content in relation to the predicted target "pasting" location or locations. An existing tone analyzer service or technique can be used. Depending on the detected tone of the copied content, the methodology may change the cursor "tone," which can be manifested as emojis, voice, text, or other. Changing the cursor "tone" may be also done based on the importance or context such as writing an email in a professional setting as compared to another setting.

The concern or risk level may also be associated with any of: cognitive state of the user (e.g., the user is tired, the user has already made an error associated with a copy/paste operation within a time period); potential social exposure (an error made in pasting into a communication channel with many readers and which cannot be retracted).

In an embodiment, the methodology may change a vigilance level, L, e.g., raise the level so that the likeliness of producing a particular warning response is more likely. The methodology may also adjust a vigilance level, L, based on one or more application or organization specific rules. For example, copying and pasting sensitive information from Health Insurance Portability and Accountability Act (HIPPA)-protected patient records warrants more caution than copying and pasting sensitive information from a Customer Relationship Management System, for instance.

Various non-cursor GUI changes may take place based on the content of the information in the clipboard. For example, the frame colour of MS Word, Photoshop, email client, instant message client, the task bar, the desktop, etc. may change based on clipboard or memory buffer contents. As an example, the frame colour can change (from black to red) in a word processing editor document responsive to determining that the content contains information intended for a particular recipient, to potentially warn the user to not copy the contents to an unintended recipient.

In an embodiment, the methodology may learn the type of cursor controller which can be problematic to a user or user cohort. For example, a user may be comfortable using an optical mouse and perform actions accurately with such an optical mouse, but not so comfortable with using a trackpoint or a touchscreen. The methodology may help a user more on the devices they are less comfortable with. Such comfort level with a particular device can be determined based on usage of different devices by different users. The methodology can be useful in situations where a given cursor controller is not available, for example, the user left the mouse in the office when travelling. The methodology in an embodiment may estimate a user's comfort level or accuracy using different devices (e.g., a mouse versus a trackpoint) by monitoring the user's errors or number of "undo" actions over time. For example, if a user has attempted to use a trackpoint to copy text, then pasted the text, and then reverted, or undid, the action 50 times out of 100 uses, then this may suggest that the user is uncomfortable with and/or inaccurate using a trackpoint. As another example, if the user has only undone (reverted) a copy/paste operation using a mouse twice out of the previous 100 copy/paste operations, then the user may be determined to be relatively comfortable or accurate using a mouse.

In an embodiment, the methodology may learn when a user has most likely made an error and only help the user at those times. For example, if the methodology estimates that the user meant to copy a word or two, but accidentally selected all the words on a page, the methodology may change the cursor characteristic such as its colour or shape, to confirm that the user has a large amount of content in the buffer. In an embodiment, the methodology can keep track of the editing functions in a session. The statistics collected during the editing session may indicate that the user tends to only change one word or two at a time, so it would be unusual for the user to cut and paste large sections of text. For example, the methodology may detect an outlier in statistical data to determine whether the user intended to copy and paste only a few words rather than a large amount of copied data.

As another example, the target position of the cursor where the copied content is to be pasted and the amount of data to be pasted can determine whether the user intended for insertion of the content. For example, if a user is about to copy a large amount of text into the middle of a sentence in the user's document, it is likely that the user did not want to copy 5000 words into the middle of that sentence.

In an embodiment, the methodology may determine the user context from the user interactions with an application (e.g., word processing editor) and computing device based on capturing and analyzing event streams such as, but not limited to, the user's typing speed, reading speed, clicking, start, pause, stop, zoom-in, zoom-out, click and hover. A user context such as happy, sad, bored, during the use of the computing device can be also captured and used. Based on such context, the methodology may determine whether to change or not change a cursor's appearance. A user context such as happy, sad, bored during the use of the computing device can be also captured and used to determine whether to change a cursor's appearance. In an embodiment, a user's facial expression may be optionally monitored using known methods for estimating a user's emotional state based on facial analysis. The methodology may also learn moods from micro-expressions as it monitors expressions. As an example the cursor might change appearance, to a smiley face, to engage the user if it is determined that they are bored or sad.

In an embodiment, the transition from a default cursor visual appearance to an appearance reflecting the content of the clipboard (copy/paste buffer) may be performed instantly, or it may be gradual (e.g., over a second or two). In another embodiment, the cursor's appearance may change back to its original appearance responsive to determining that the problem is fixed (e.g., the content in the buffer is returned to its original position and not modified).

In an embodiment, the methodology may cause the text or image being put into the clipboard to hover near the cursor (e.g., in a small font or thumbnail).

In an embodiment, the methodology may include allowing a user to define one or more rules and save the rules in a user preference setting. The methodology may control the cursor's visual appearance based on one or more of the user-defined rules. For example, a user-defined rule may specify how the cursor should be changed based on one or more factors. For instance, an example of a rule may include: If the copied content sentiment or tone is too "negative" (e.g., based on comparing with a predefined threshold value), change the cursor appearance accordingly (e.g., the user can specify the characteristics of the cursor associated with the sentiment/tone such as the voice, colour, and size). Another example of a rule may include: If a user cognitive state is deemed to be "tired" or "stressed", non-cursor GUI changes may take place based on the clipboard. Whether the user is "tired" or "stressed" can be determined based on, for example, facial expression analysis, input speed (e.g., typing speed), number of errors in typing, and/or others.

In an embodiment, a cursor may operate in different modes, for instance, static and dynamic. In the static mode, the cursor changes to a predetermined list of indicators (e.g., the cursor colour changes, the cursor blinking rate changes, a word is spoken, and/or the frame of a text editor changes) for a particular document, clipboard content, or application. For example, when the user is copying content from the Internet on a particular Web browser, the cursor may change appearance. In static mode, the cursor may always use one or more indicators for a particular document, clipboard content, or application. In dynamic mode, the methodology determines which one or more visual indicators or appearances to select and reflect on cursor or non-cursor elements. The changes for a particular document or application may change depending on the user's context, behavior, or cognitive state as discussed.

In an embodiment, an action can be taken to alert others. For example, the methodology may include notifying an author of text in a chat (e.g., one on one chat) that the author's text or content has been copied by another user. The methodology may also notify the author to the target location to which the content may have been copied or sent (e.g., electronically mailed (e-mailed)), if available. Such notification can serve to alert others in cases, for example, so that the author may receive appropriate credit and/or be apprised of the use of the author's contribution. In another aspect, such notification may prevent accidental pasting of confidential data to external targets or email addresses. In an embodiment, the user's cursor also indicates that a notification is being sent to others.

Figure 1:
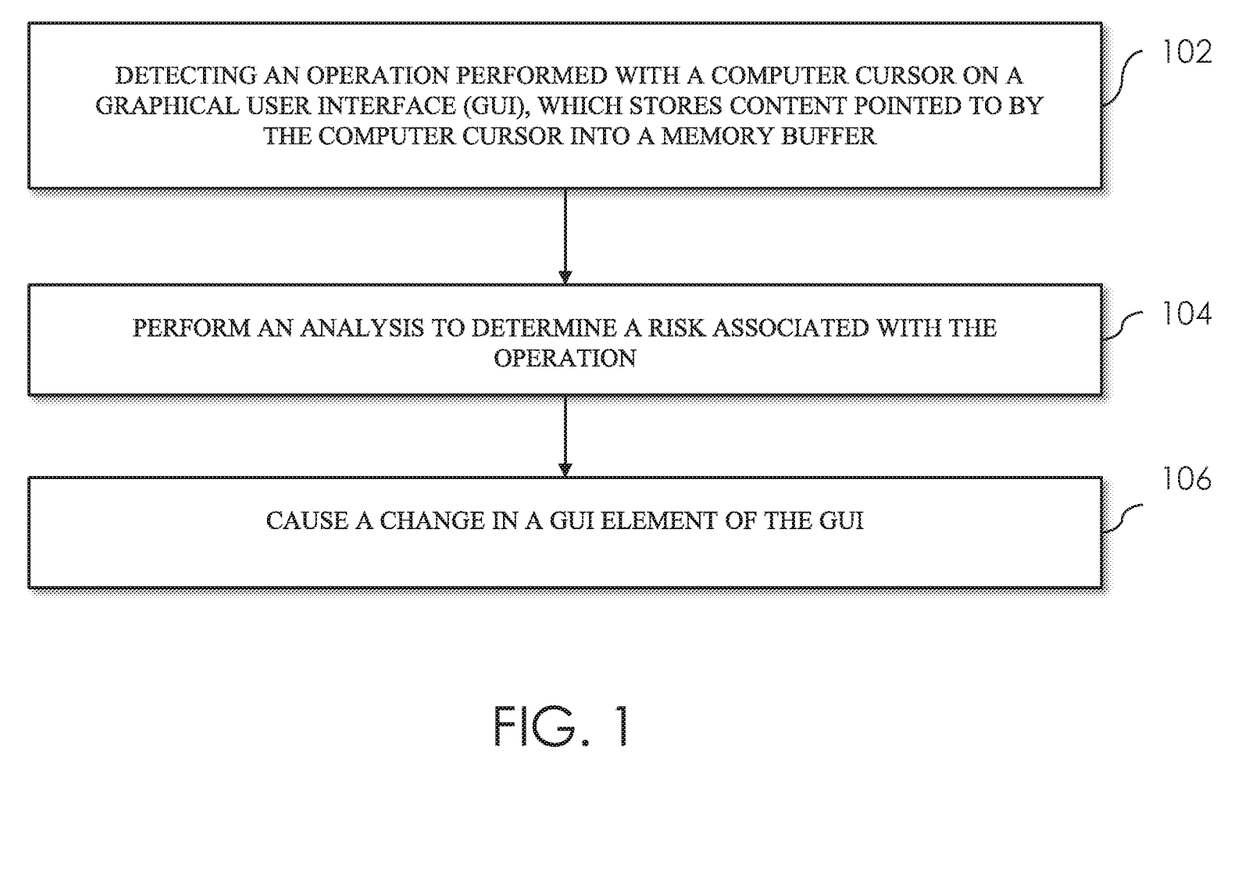
FIG. 1 is a diagram illustrating a method in one embodiment.

FIG. 1 is a diagram illustrating a method in one embodiment. The method can provide a vigilant cognitive cursor based on clipboard or memory buffer content. The method can be executed by or executed on one or more processors such as hardware processors. One or more processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors. A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

At 102, the method may include detecting an operation performed with a computer cursor on a graphical user interface (GUI), which copies or stores content pointed to (e.g.. selected) by the computer cursor into a memory buffer such as a clipboard. The content can be any of text, image, and/or other content. An operation performed with a computer cursor can be performed via an input device or mechanism such as, but not limited to, a pointing device, a mouse, a trackpoint, a joystick, touchpad, keyboard, finger or hand gesture, eye-gaze, EEG-brainwave interface.

At 104, the method may include performing an analysis to learn or determine a risk associated with the operation. Analyzing may include determining any one or more of the number of words selected and placed in the buffer (e.g., clipboard), number of images selected, content of text, content of images, confidentially of content, keywords in text, product names in text, the presence of confidential data such as product photos or copyrighted photos, inappropriate expression or language in text or image, language of the text (e.g., English), who the intended recipient is, whether proper attribution to the source is given. The risk or level of risk can be determined based on such data or information.

In an embodiment, the risk or concern can be associated with any one or more of: cognitive state of the user (e.g., the user is tired, the user has already made an error associated with a copy/paste operation within a defined time period); potential social exposure (e.g., an error made in pasting into a communication channel with many viewers and which cannot be retracted, e.g., a social network).

At 106, the method may include, based on the analysis, changing, or causing change in, a GUI element. An example of a change includes a change in an appearance characteristic or attribute of the computer cursor. For instance, any one or more of cursor size, shape, shade, colour, symbol, animation, blinking rate can change. Another example of a change in a GUI element includes generating a sound, such as but not limited to, a spoken word or words such as a warning word, beep and chime. Another example of a change in a GUI element can include producing a haptic feedback, such as but not limited to, increased weight or friction associated with more content in an input device such as, but not limited to a mouse, buzzing of mouse and change in mouse response rate. As another example, a cursor can change its appearance and can be animated to speak a warning word. Yet in another example, the cursor can change into an emoji or like character and the emoji may reflect a level of risk associated with the operation. Another example of a GUI element change may include a frame or window of an editor such as a word processing editor, slide or presentation editor, or another application which uses a cursor. For example, a GUI element not directly associated with a cursor can be changed or generated, for example, a change on a computer screen incorporating the computer cursor. Examples can include, but not limited to, the colour of a frame of an application such as a word processor or image editor, a task bar changes.

In an embodiment, the change in the GUI element can be caused or triggered based on a level of the determined risk. For instance, a "vigilance level," L, may be maintained and raised based on the risk, so that producing a particular warning response is more likely.

In an embodiment, the cursor change can be caused based on content semantics and/or social features of a predicted target "pasting" location(s) and/or user context. The method may detect or predict the target "pasting" location of the copied content, for example, by tracking the user eye-gaze via eye tracking performed using a camera which may be connected to a computer device, and/or analyzing previous cursor location or locations.

Examples of the user context may include, but not limited to, one or more of: time of day and location, context determined from input device movements such as mouse movements (e.g., speed, accuracy, which may suggest a user is tired or alert), touchpad, trackpad, touch display device, the mood of the user (e.g., determined based on facial expressions, voices, access to calendars showing how busy a user is), context based on one or more applications and/or computing device the user has interacted with, context based on user activity (e.g., drawing, writing, calculating, music/video composing) with regard to the input device and/or computer device.

In an embodiment, the change in the GUI element can be caused based on one or more rules, e.g., user-defined rule, an organization-defined rule, and/or others, for example, which can be specified in one or more preference settings.

In an embodiment, the method can also include analyzing a tone of the copied content in relation to the predicted target "pasting" location or locations using an existing tone analyzing service. Based on the detected tone, the cursor "tone" may change which can be manifested as emojis, voice, text, and/or another. A change can also take into account the importance or context of the document.

In an embodiment, an appearance of the cursor can inform the user that others will be notified of the paste action. For example, a cursor with a different or designated graphics can indicate the others are or will be notified of a paste action. In an embodiment, the user and intended recipient can be alerted based on a paste action, e.g., if copied content is copied from an external document and no citation is given.

In an embodiment, a measure, or concern, or risk associated with a copy (or cut) and paste operation can be learned, for example, based on determining a state of the user. In an embodiment, a method may dynamically compute and change a vigilance level, L, based on which whether to automatically produce a particular warning (e.g., by change of a cursor or another GUI) can be determined. In an example, the higher the vigilance level, more likely it is that the cursor change would occur.

Figure 2:
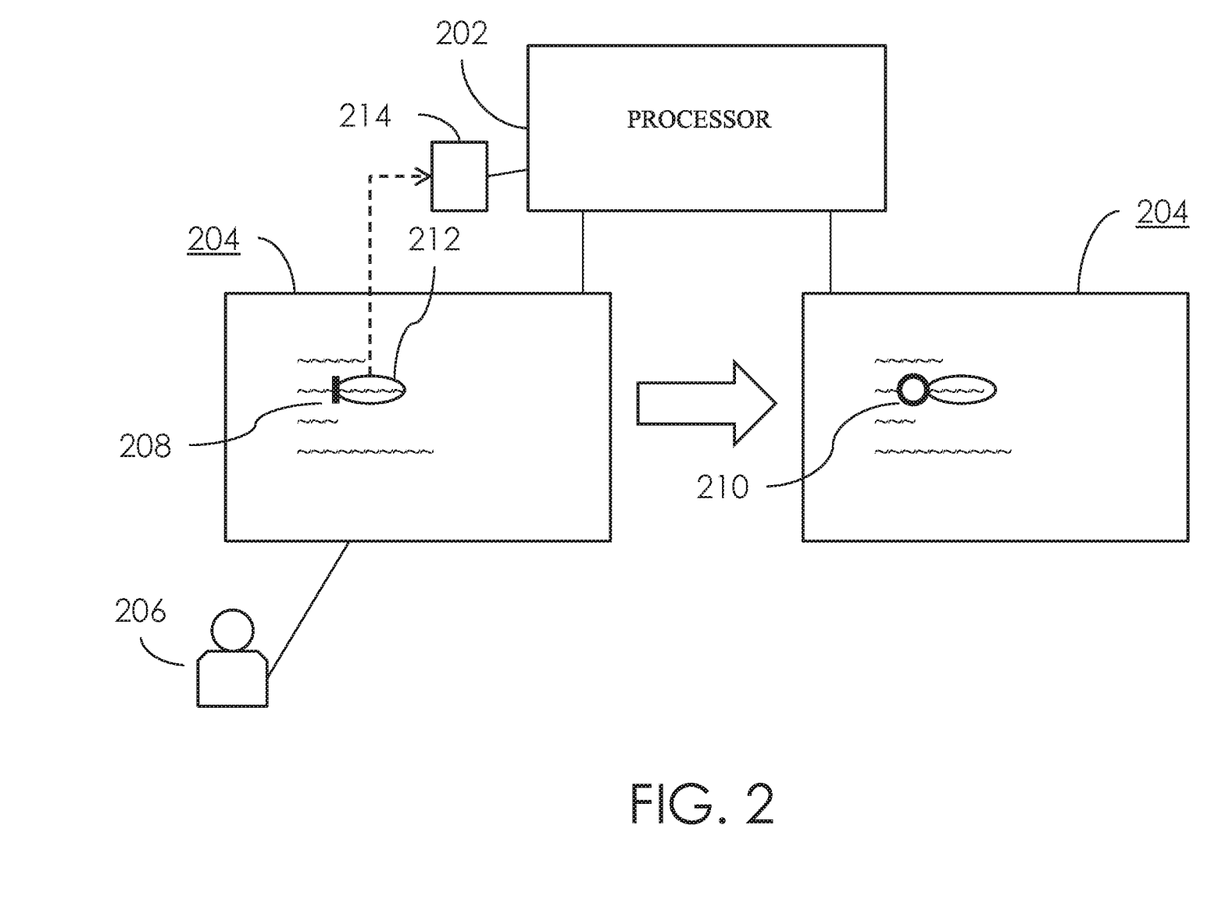
FIG. 2 is a diagram showing a system overview in one embodiment.

FIG. 2 is a diagram showing a system overview in one embodiment. A processor 202 such as a computer processor can detect input from a user 206 on a user interface screen or display, e.g., a graphical user interface (GUI) 204. A computer cursor 208 appears on the user interface screen. Input action can be performed at the location of the cursor 208. The processor detects an operation performed with the cursor 208 or at the location of the cursor on the GUI 204, which operation stores content 212 pointed to by the computer cursor (e.g., selected using the cursor) into a memory buffer 214. The processor performs an analysis to determine a risk associated with the operation and based on the analysis, cause a change in a GUI element of the GUI, for example, as shown at 210. As described above, the changes can take many forms, including changes related to the cursor itself, changes not directly related to the cursor itself, for example, but with an application such as the frame of the application on the GUI, a generation of a sound, haptic feedback on an input device or another device.

Figure 3:
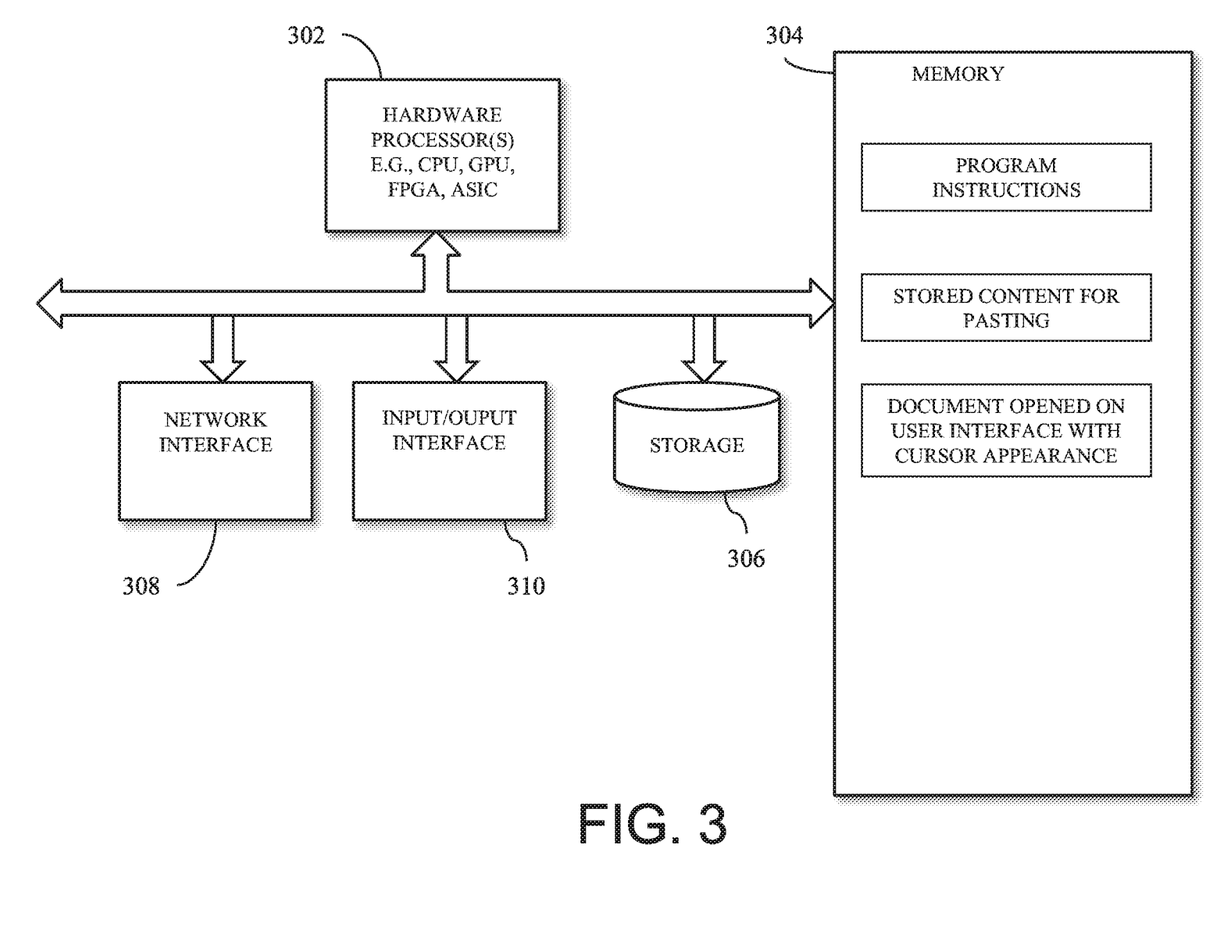
FIG. 3 is a diagram showing components of a system in one embodiment that can provide a vigilant cognitive cursor based on clipboard or memory buffer content.

FIG. 3 is a diagram showing components of a system in one embodiment that can provide a vigilant cognitive cursor based on clipboard or memory buffer content. One or more hardware processors 302 such as a central processing unit (CPU), a graphic process unit (GPU), and/or a Field Programmable Gate Array (FPGA), an application specific integrated circuit (ASIC), and/or another processor, may be coupled with a memory device 304, and provide a cognitive or intelligent cursor. A memory device 304 may include random access memory (RAM), read-only memory (ROM) or another memory device, and may store data and/or processor instructions for implementing various functionalities associated with the methods and/or systems described herein. One or more processors 302 may execute computer instructions stored in memory 304 or received from another computer device or medium. A memory device 304 may, for example, store instructions and/or data for functioning of one or more hardware processors 302, and may include an operating system and other program of instructions and/or data. One or more hardware processors 302 may detect an operation performed at a computer cursor location on a graphical user interface (GUI), which operation stores content pointed to by the computer cursor (e.g., content selected using the computer cursor) into a memory buffer. For instance, at least one hardware processor 302 may perform an analysis to determine a risk associated with the operation, based on the analysis, cause a change in a GUI element of the GUI. In an aspect, input data may be stored in a storage device 306 or received via a network interface 308 from a remote device, and may be temporarily loaded into a memory device 304 for providing an intelligent or cognitively enabled cursor. One or more hardware processors 302 may be coupled with interface devices such as a network interface 308 for communicating with remote systems, for example, via a network, and an input/output interface 310 for communicating with input and/or output devices such as a keyboard, mouse, display, and/or others.

Figure 4:
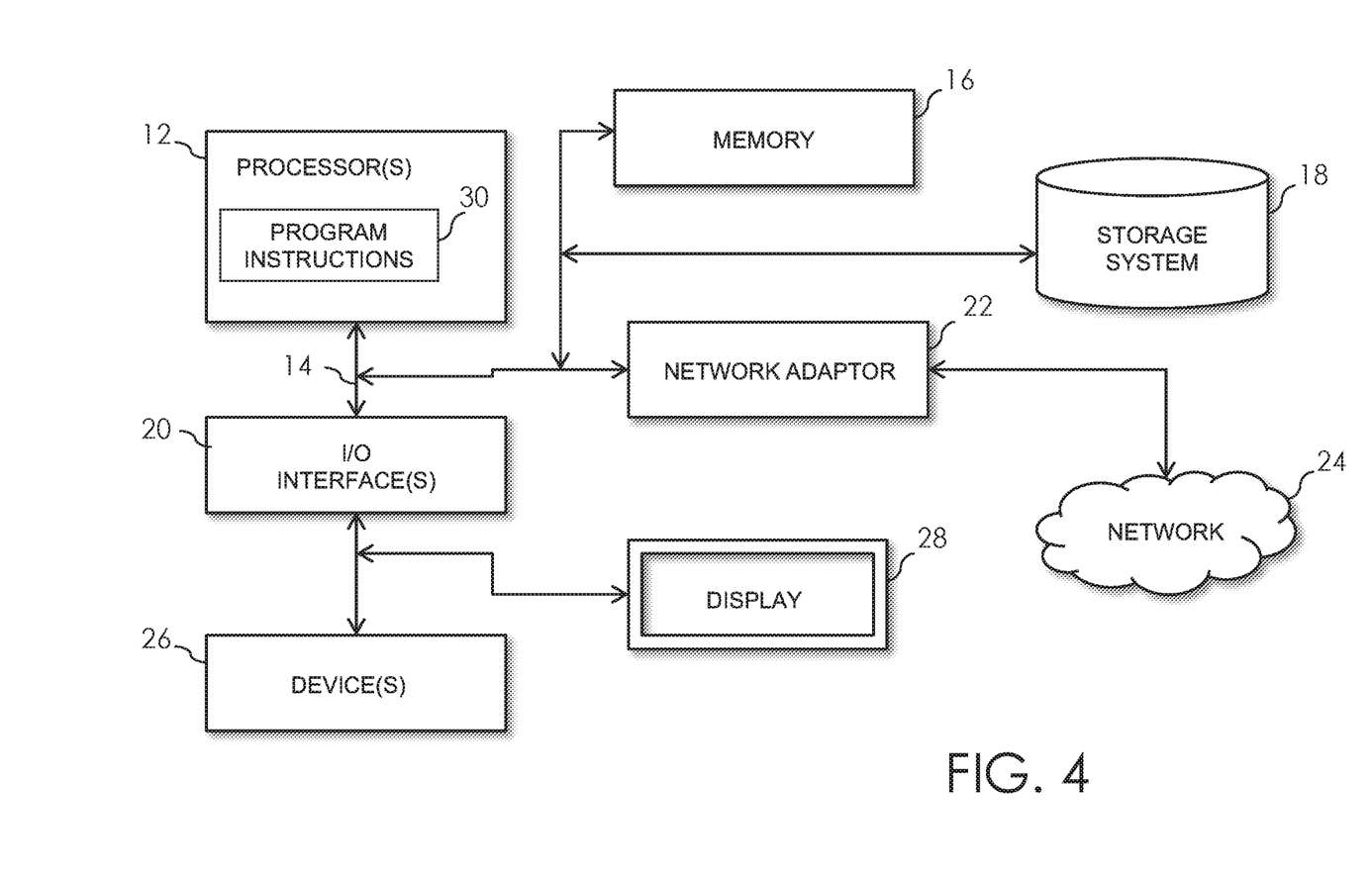
FIG. 4 illustrates a schematic of an example computer or processing system that may implement a system in one embodiment of the present disclosure.

FIG. 4 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
    detecting an operation performed with a computer cursor on a graphical user interface (GUI), which stores content pointed to by the computer cursor into a memory buffer;
    performing an analysis to determine a risk associated with the operation; and
    based on the analysis, causing a change in a GUI element of the GUI,
    wherein the change in the GUI element includes a change in appearance of the computer cursor, the computer cursor being a movable indicator on a computer screen identifying a position that can be affected by input from the user and controlled via an input device, the appearance changing differently based on a level of the determined risk, wherein the cursor's size indicates an amount of the content selected for the operation,
    the change in the GUI element further including a change in appearance of a frame of an editor opened on the GUI in which the computer cursor appears.

2. The method of claim 1, wherein the analysis determines the risk based on determining at least one selected from a group of: a number of words selected and placed in the memory buffer, a number of images selected, content of text, content of images, confidentially of content, keywords in text, product names in text, the presence of confidential data such as product photos or copyrighted photos, inappropriate expression or language in text or image, language of the text (e.g., English), who the intended recipient is, whether content has been given proper attribution.

3. The method of claim 1, wherein the change in the GUI element includes producing a sound.

4. The method of claim 1, wherein the change in the GUI element includes a haptic feedback.

5. The method of claim 1, wherein the change in the GUI element includes a change on a computer screen incorporating the computer cursor.

6. The method of claim 1, wherein the analyzing includes determining a state of a user performing the operation.

7. The method of claim 6, wherein the state of the user includes at least tiredness determined from analyzing a facial expression image of the user.

8. The method of claim 6, wherein the state of the user includes at least whether the user has made a previous error associated with the operation within a defined time period.

9. The method of claim 6, wherein the state of the user includes at least whether the user has made an error pasting into a communication channel of a social network.

10. The method of claim 1, wherein the change in the GUI element is caused based on a level of the determined risk.

11. The method of claim 1, further including predicting a target location to which the content is likely to be pasted and causing the change in the GUI element based on the predicted target location.

12. The method of claim 1, wherein the change in the GUI element is caused based on determining a user context including at least one selected from a group of: speed of input device movement, accuracy of input device movement, mood of the user, user's interaction with an application, a type of user activity with respect to the input device.

13. The method of claim 1, wherein the change in the GUI element is caused based on a predefined rule.

14. The method of claim 1, wherein the change in the GUI element includes a cursor changed into an emoji reflecting a tone of the content.

15. A system comprising:
    a hardware processor; and
    a memory device coupled with the hardware processor;
    the hardware processor configured to at least:
        detect an operation performed with a computer cursor on a graphical user interface (GUI), which copies content pointed to by the computer cursor into a memory buffer on the memory device;
        perform an analysis to determine a risk associated with the operation; and
        based on the analysis, cause a change in a GUI element of the GUI,
        wherein the change in the GUI element includes a change in appearance of the computer cursor, the computer cursor being a movable indicator on a computer screen identifying a position that can be affected by input from the user and controlled via an input device, the appearance changing differently based on a level of the determined risk, wherein the cursor's size indicates an amount of the content selected for the operation,
        the change in the GUI element further including a change in appearance of a frame of an editor opened on the GUI in which the computer cursor appears.

16. The system of claim 15, wherein the change in the GUI element includes a cursor changed into an emoji reflecting a tone of the content.

17. The system of claim 15, wherein the analyzing includes determining a state of a user performing the operation to determine the risk.

18. The system of claim 15, wherein the change in the GUI element is caused based on a level of the determined risk.

19. A computer program product comprising a computer readable storage medium having program instructions embodied therewith, the program instructions executable by a device to cause the device to:
    detect an operation performed with a computer cursor on a graphical user interface (GUI), which copies content pointed to by the computer cursor into a memory buffer;
    perform an analysis to determine a risk associated with the operation; and
    based on the analysis, cause a change in a GUI element of the GUI,
    wherein the change in the GUI element includes a change in appearance of the computer cursor, the computer cursor being a movable indicator on a computer screen identifying a position that can be affected by input from the user and controlled via an input device, the appearance changing differently based on a size of the content, wherein the cursor's size indicates an amount of the content selected for the operation, the change in the GUI element further including a change in appearance of a frame of an editor opened on the GUI in which the computer cursor appears.

* * * * *